(12) United States Patent
Shekleton et al.

(10) Patent No.: US 8,752,643 B2
(45) Date of Patent: Jun. 17, 2014

(54) RIPPER ASSEMBLY WITH DIRECT LOAD PATH

(75) Inventors: Travis Alan Shekleton, Peosta, IA (US); Leroy Ernest Kraske, Dubuque, IA (US); Jefferson Scott Reynolds, Cedar Falls, IA (US); David John Rix, Sandy, UT (US)

(73) Assignee: Deere & Company, Moline, IL (US)

( * ) Notice: Subject to any disclaimer, the term of this patent is extended or adjusted under 35 U.S.C. 154(b) by 1587 days.

(21) Appl. No.: 11/696,752

(22) Filed: Apr. 5, 2007

(65) Prior Publication Data

US 2008/0245540 A1    Oct. 9, 2008

(51) Int. Cl.
*A01B 13/08* (2006.01)
(52) U.S. Cl.
USPC ........................................... 172/699; 172/677
(58) Field of Classification Search
USPC ................. 172/484, 196, 699, 451, 677, 773
See application file for complete search history.

(56) References Cited

U.S. PATENT DOCUMENTS

| | | | | |
|---|---|---|---|---|
| 166,200 A | * | 8/1875 | Gaylord et al. | 172/369 |
| 2,955,369 A | * | 10/1960 | Shumaker et al. | 37/372 |
| 3,032,903 A | * | 5/1962 | Ede | 37/370 |
| 4,313,504 A | | 2/1982 | Fischer | |
| 4,664,220 A | | 5/1987 | Ruhter et al. | |
| 7,086,184 B2 | | 8/2006 | Archuleta, Jr. et al. | |

OTHER PUBLICATIONS

Images of Deere D-Series Motor Grader Ripper Assembly With Offset Load Path (6 sheets)(Admitted Prior Art).
Images of Caterpillar Motor Grader Rear Ripper Assembly (2 sheets)(Admitted Prior Art).

* cited by examiner

*Primary Examiner* — Matthew D Troutman
(74) *Attorney, Agent, or Firm* — Faegre Baker Daniels LLP

(57) ABSTRACT

A work vehicle, such as a motor grader, comprises a frame, a ripper, a tie bar attached to the frame, and a four-bar linkage attached to and disposed between the ripper and the tie bar for transferring a load between the ripper and the frame via the four-bar linkage and the tie bar. The four-bar linkage and the tie bar are co-planar with respect to a plane within which the four-bar linkage is movable relative to the frame. A toolbar for the ripper is also disclosed.

16 Claims, 7 Drawing Sheets

RIPPER ASSEMBLY WITH DIRECT LOAD PATH

FIELD OF THE DISCLOSURE

The present disclosure relates to rippers for breaking up earth material.

BACKGROUND OF THE DISCLOSURE

A ripper may be attached to a work vehicle, such as a motor grader or other work vehicle, to break up earth material. The term "ripper" as used herein includes not only rippers but also scarifiers.

SUMMARY OF THE DISCLOSURE

According to the present disclosure, there is provided a work vehicle that comprises a frame, a ripper, a tie bar attached to the frame, and a four-bar linkage. The four-bar linkage is attached to and disposed between the ripper and the tie bar for transferring a load between the ripper and the frame via the four-bar linkage and the tie bar. The four-bar linkage and the tie bar are co-planar with respect to a plane within which the four-bar linkage is movable relative to the frame. The four-bar linkage and the tie bar are thus in-line with one another defining a direct (rather than offset) load path between the ripper and the frame. Such load path management allows for a relatively light-weight ripper assembly with concomitant cost reductions.

A toolbar for the ripper is also disclosed. The toolbar supports a number of teeth adapted to break up earth material upon movement of the ripper in a forward direction by the work vehicle. The toolbar comprises a V-shaped leading edge defined by an underside surface and an inclined surface sloping upwardly and rearwardly from the underside surface at an acute angle thereto. It is believed that such a V-shaped leading edge would urge earth material to flow over the toolbar instead of under it. If such earth material were to flow under the toolbar, the earth material could be compacted, resulting in a drawbar load on the machine and limiting the depth of cut. However, it is believed that, by urging the earth material to flow over the toolbar, such compaction may be avoided, allowing a deeper cut.

The above and other features will become apparent from the following description and the attached drawings.

BRIEF DESCRIPTION OF THE DRAWINGS

The detailed description of the drawings refers to the accompanying figures in which.

DETAILED DESCRIPTION OF THE DRAWINGS

Figure 1:
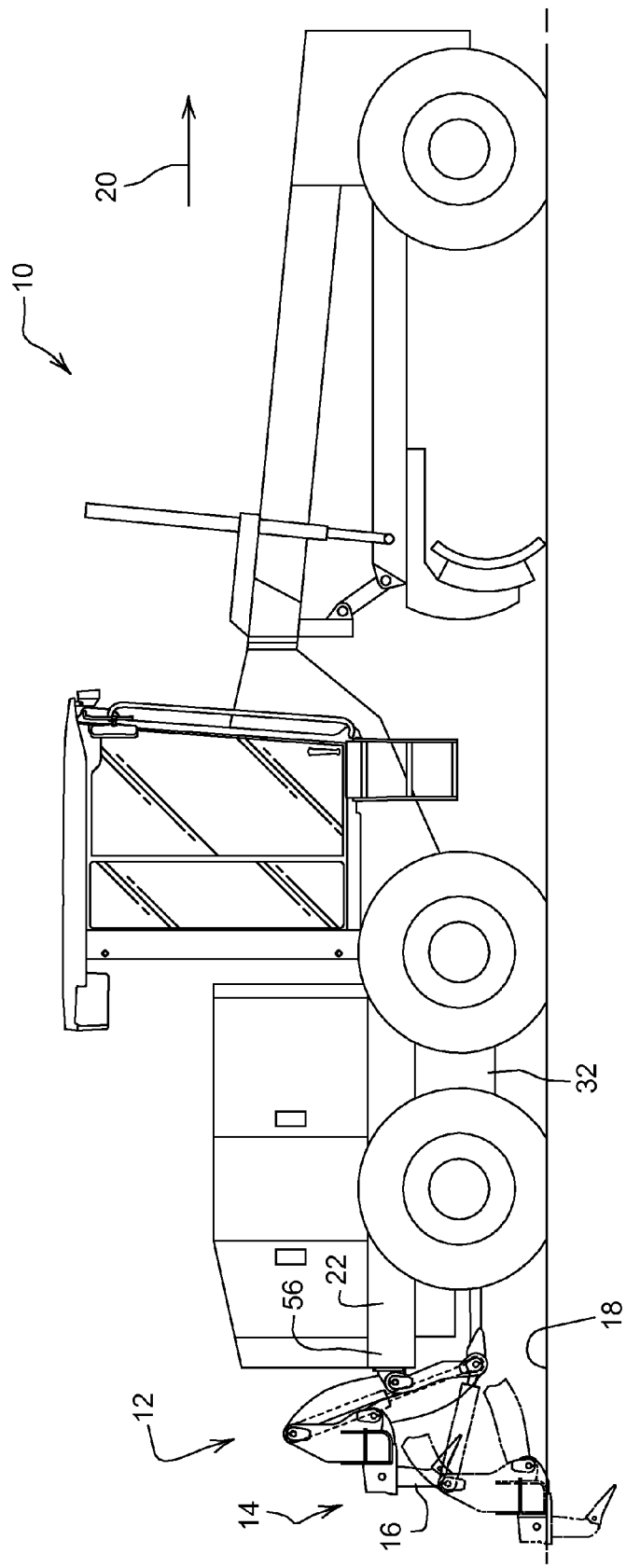
FIG. 1 is a side elevation view of a work vehicle in the form of, for example, a motor grader with a ripper assembly attached to the rear thereof, the ripper assembly being movable between a raised, stowage position shown in solid lines and a lowered, use position shown in phantom.

Referring to FIG. 1, there is shown a work vehicle 10 with a ripper assembly 12 attached thereto. Illustratively, the work vehicle 10 is a motor grader. However, it is to be understood that the ripper assembly 12 may be attached to other types of work vehicles including, but not limited to, crawlers and other mobile construction equipment. Further illustratively, the ripper assembly 12 is shown attached to a rear of the vehicle 10, but may be attached at other locations, including the front or an intermediate location.

The ripper assembly 12 is configured for movement of a ripper 14 thereof between a raised, stowage position shown in solid lines in FIG. 1 and a lowered, use position shown in phantom lines in FIG. 1. When in the lowered, use position, teeth 16 of the ripper 14 attached to a toolbar 17 of the ripper 14 are designed to dig into earth material 18 of the ground to break up the earth material 18 upon advancement of the vehicle 10 in a forward direction 20. The resulting load on the ripper assembly 12 is transmitted to a frame 22 of the vehicle 10.

Figure 2:
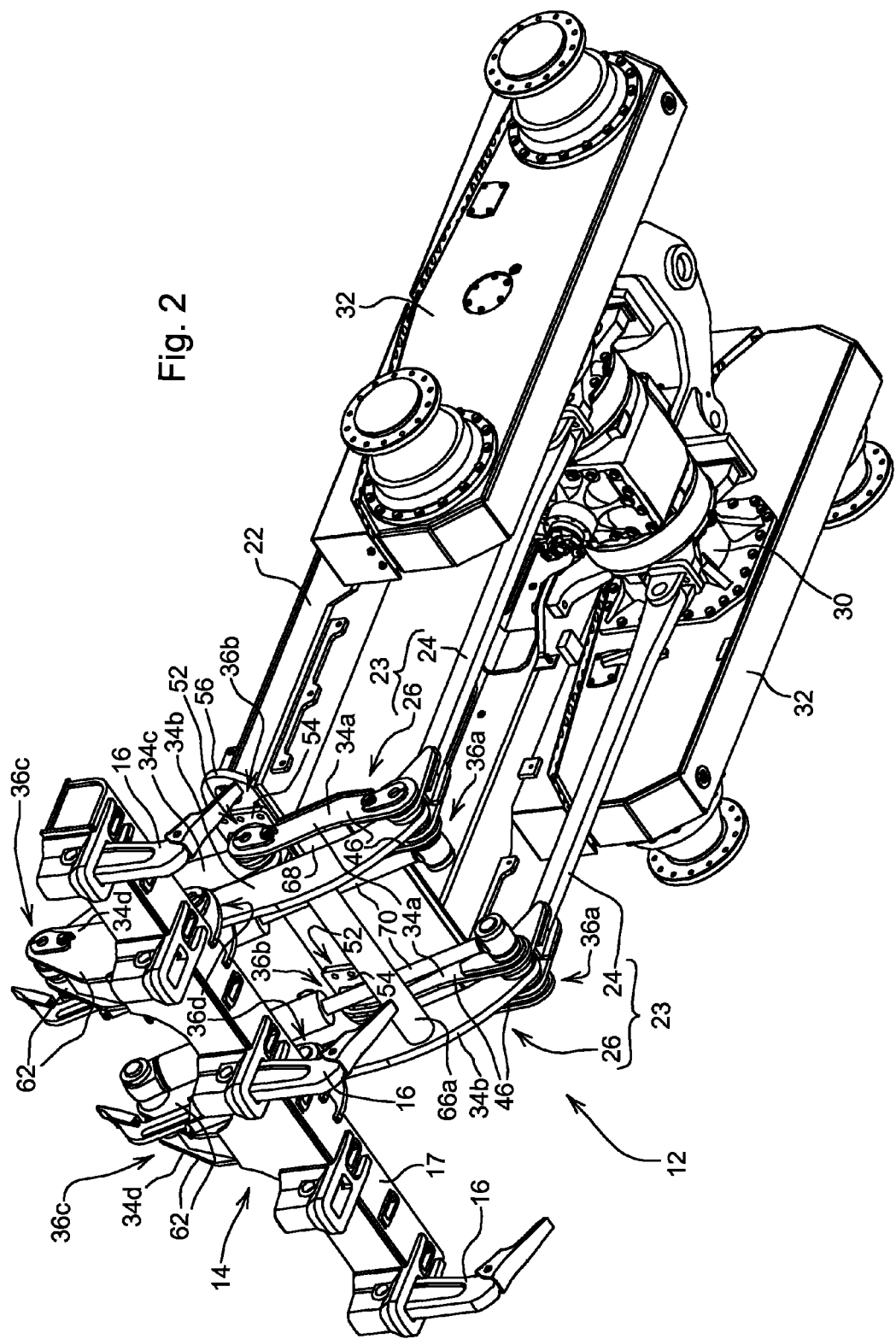
FIG. 2 is a rear perspective view showing the ripper assembly attached to a frame of the work vehicle.
Figure 3:
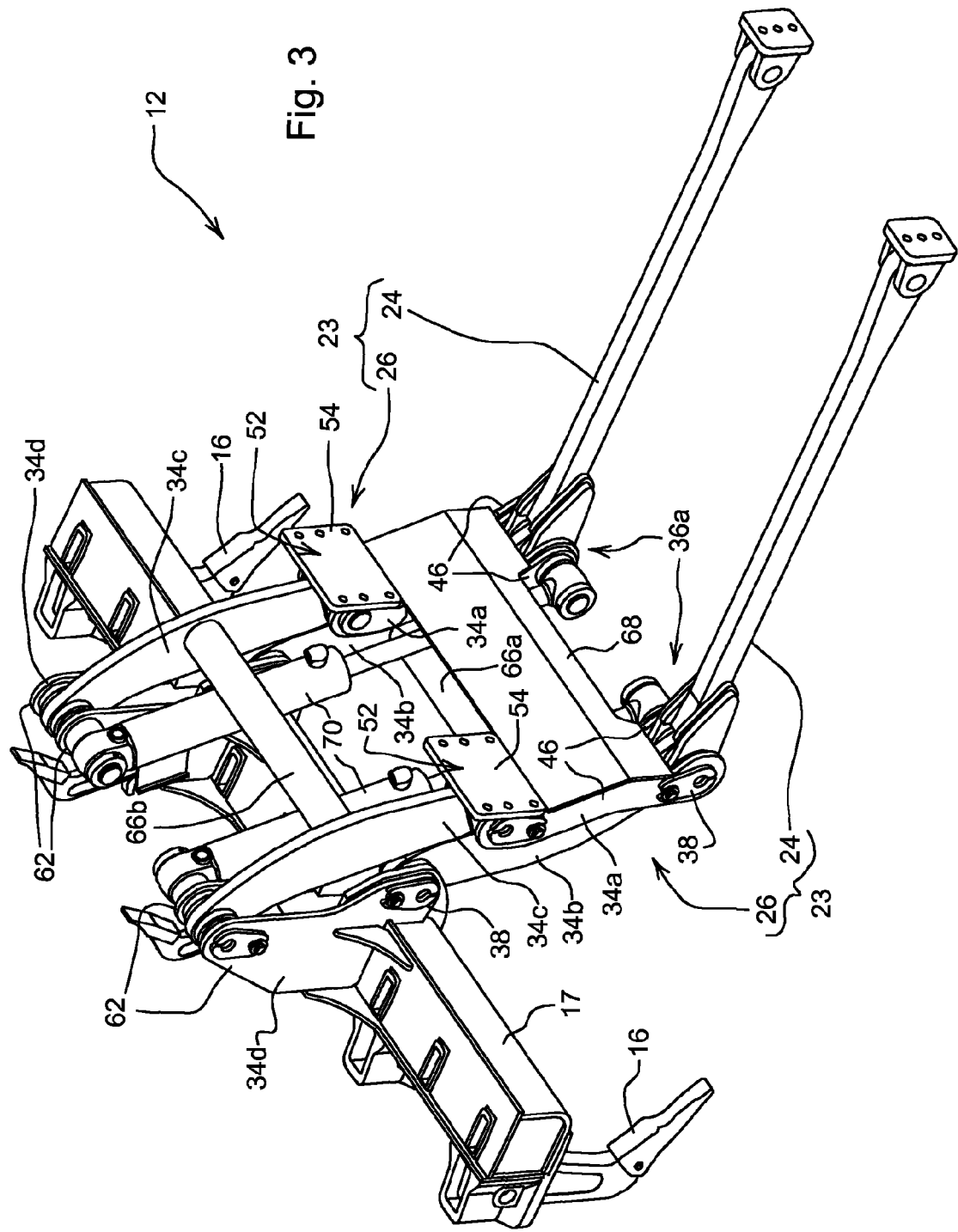
FIG. 3 is a perspective view showing that the ripper assembly includes a ripper (to the left), a pair of tie rods (to the right), a pair of four-bar linkages interconnecting the ripper and the tie rods, and a pair of hydraulic cylinders for moving the ripper between the stowage and use positions.
Figure 4:
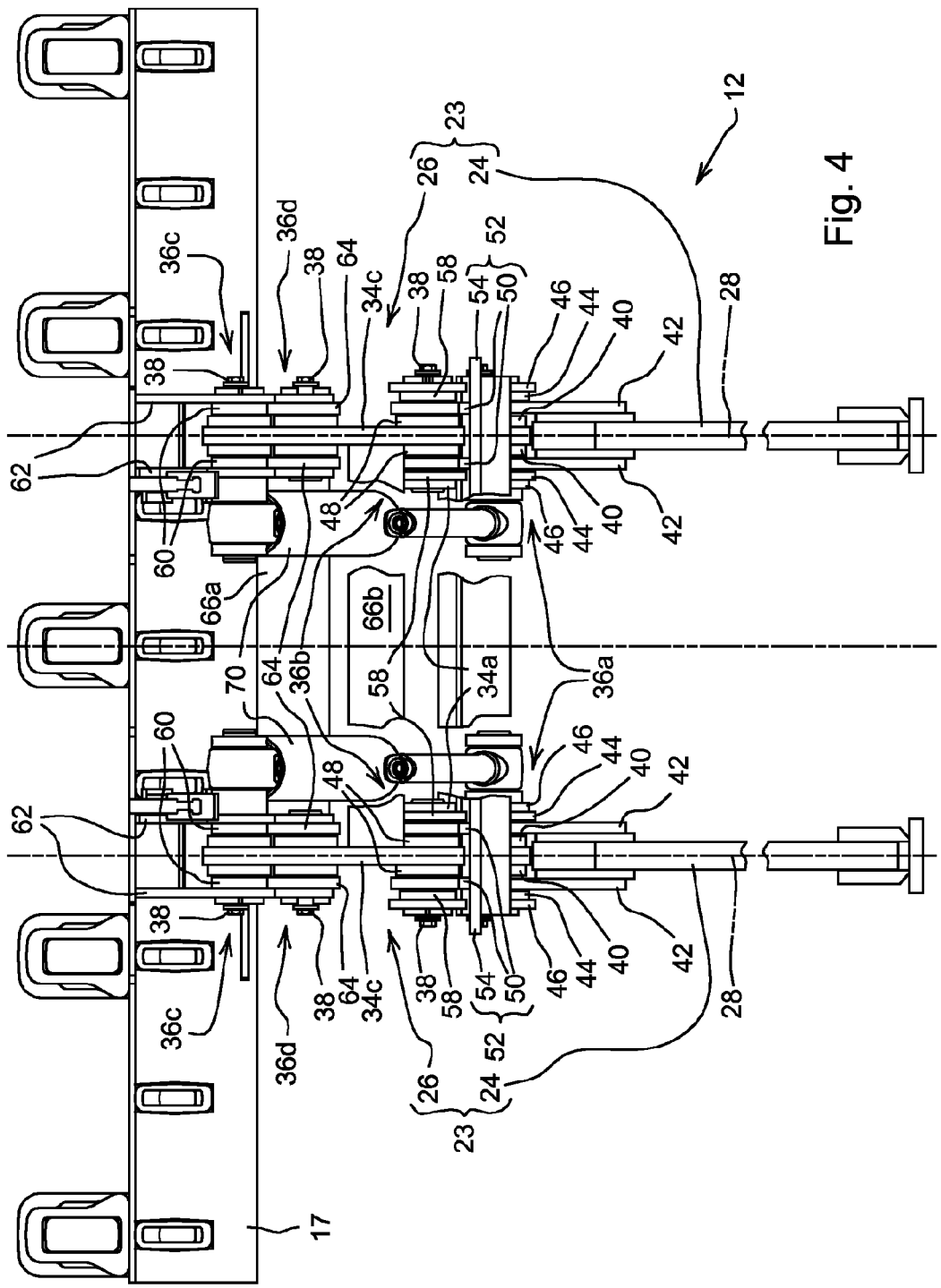
FIG. 4 is a plan view showing that each four-bar linkage is in-line with the respective tie bar.

Referring to FIGS. 2-4, the exemplary ripper assembly 12 comprises the ripper 14 and two direct load paths 23 attached to and disposed between the ripper 14 and the frame 22, the frame 22 being, for example, a motor grader rear frame having an axle housing 30 interconnecting wheel tandems 32 on opposite sides of the motor grader. The load paths 23 are structurally similar to one another such that the following description of one of the load paths 23 applies to the other load path 23 as well.

Each load path 23 comprises a tie bar 24 and a four-bar linkage 26. The four-bar linkage 26 is attached to and disposed between the ripper 14 and the tie bar 24 for transferring a load between the ripper 14 and the axle housing 30 of the frame 22 via the four-bar linkage 26 and the tie bar 24. The four-bar linkage 26 and the tie bar 24 are co-planar with respect to a plane 28 (FIG. 4) within which the four-bar linkage 26 is movable relative to the frame 22. In a plan view of the ripper assembly 12 (FIG. 4), the four-bar linkage 26 and the tie bar 24 are in-line, rather than offset, with one another, providing a load path 23 with enhanced load-management capability over offset load paths.

Each four-bar linkage 26 comprises a front ground bar 34a, lower and upper grounded bars 34b, 34c, and a rear coupler bar 34d. A first pivot joint 36a pivotally interconnects the tie bar 24, the ground bar 34a, and the lower grounded bar 36b. A second pivot joint 36b pivotally interconnects the ground bar 34a and the upper grounded bar 34c. A third pivot joint 36c pivotally interconnects the upper grounded bar 34c and the rear coupler bar 34d. A fourth pivot joint 36d pivotally interconnects the coupler bar 34d and the lower grounded bar 36b. Each joint 36a, 36b, 36c, 36d has a pivot pin 38 for pivotable movement of the respective bars thereabout.

Referring to FIG. 4, considering the first pivot joint 36a, a spacer 40 is positioned on either side of the lower grounded bar 36b, configured, for example, as a single link. Outside of each spacer 40 is an ear 42 welded to a side of the tie-bar 24. Outside of each ear 42 is another spacer 44. The ground bar 34a has, for example, two links 46. Outside of each ear 42 is one of the links 46. The pivot pin 38 of the joint 36a extends through the bar 36b, spacers 40, ears 42, spacers 44, and links 46.

Considering the second pivot joint 36b, a spacer 48 is positioned on either side of the upper grounded bar 36c, configured, for example, as a single link. Outside of each spacer 48 is an ear 50 of a clevis 52 having a plate 54 fixed to a member 56 of the frame 22. Outside of each clevis ear 50 is another spacer 58. Outside of each spacer 58 is a respective link 46 of the ground bar 34a. The pivot pin 38 of the joint 36b extends through the bar 36c, the spacers 48, the clevis ears 50, the spacers 58, and the links 46.

Considering the third pivot joint 36c, the coupler bar 34d has, for example, two links 62 fixed to the toolbar. A spacer 60 is positioned between the upper grounded bar 36c and each link 62. The pivot pin 38 of the joint 36c extends through the bar 36c, the spacers 60, and the links 62.

Considering the fourth pivot joint 36d, a spacer 64 is positioned between the lower grounded bar 36b and each link 62. The pivot pin 38 of the joint 36d extends through the bar 36b, the spacers 64, and the links 62.

The four-bar linkages 26 are joined together. A lower cross bar 66a interconnects the lower grounded bars 34b of the two linkages 26. An upper cross bar 66b interconnects the upper grounded bars 34c of the two linkages 26. Further, a reinforcement plate 68 interconnects the ground bars 34a and their links 46.

The ripper 14 is moved between its raised, stowage position and lowered, use position by a pair of hydraulic cylinders 70. Each cylinder 70 is attached to the first and third pivots 36a, 36c of a respective linkage 26.

Figure 5:
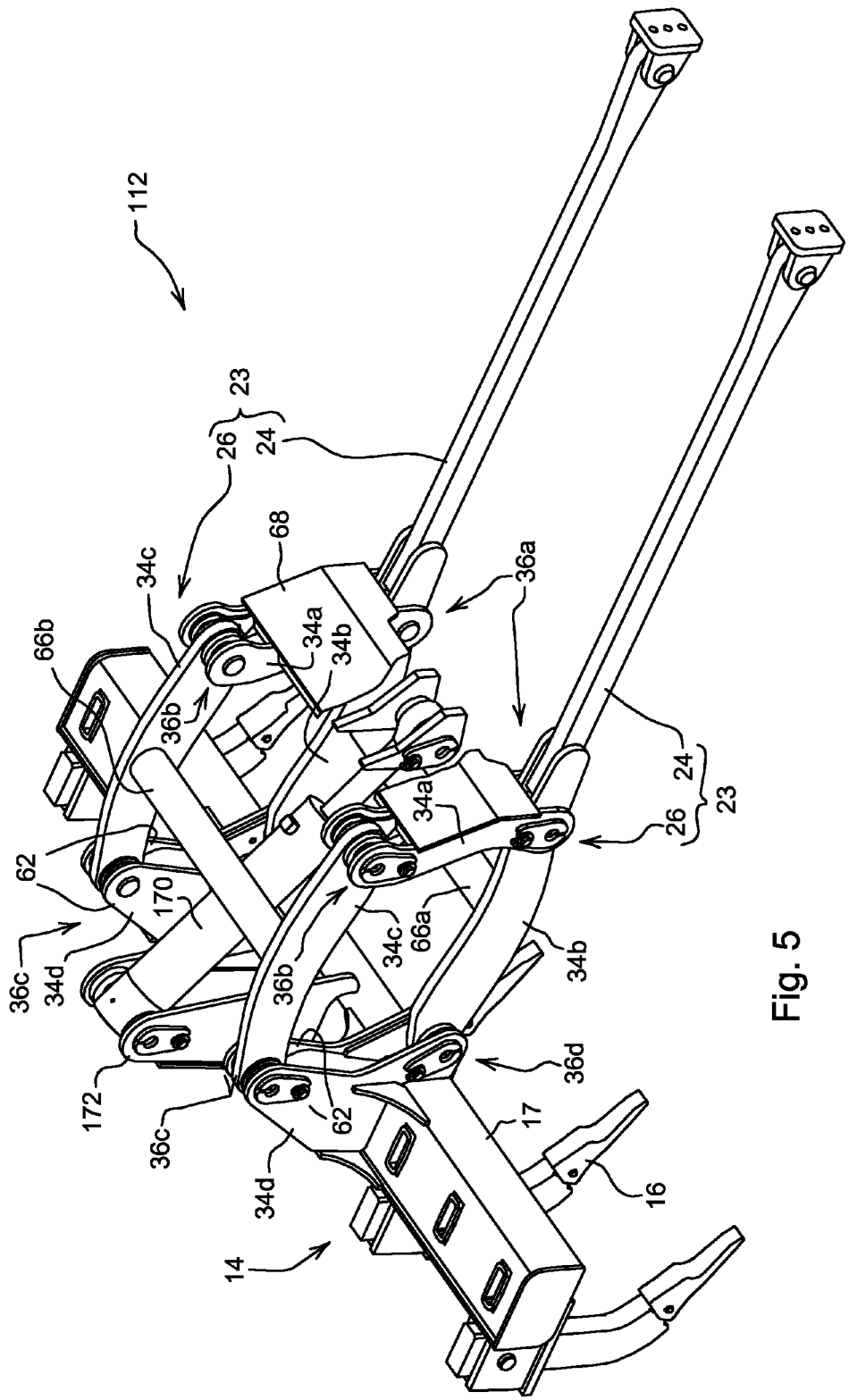
FIG. 5 is a perspective view showing an alternative ripper assembly employing only one hydraulic cylinder.
Figure 6:
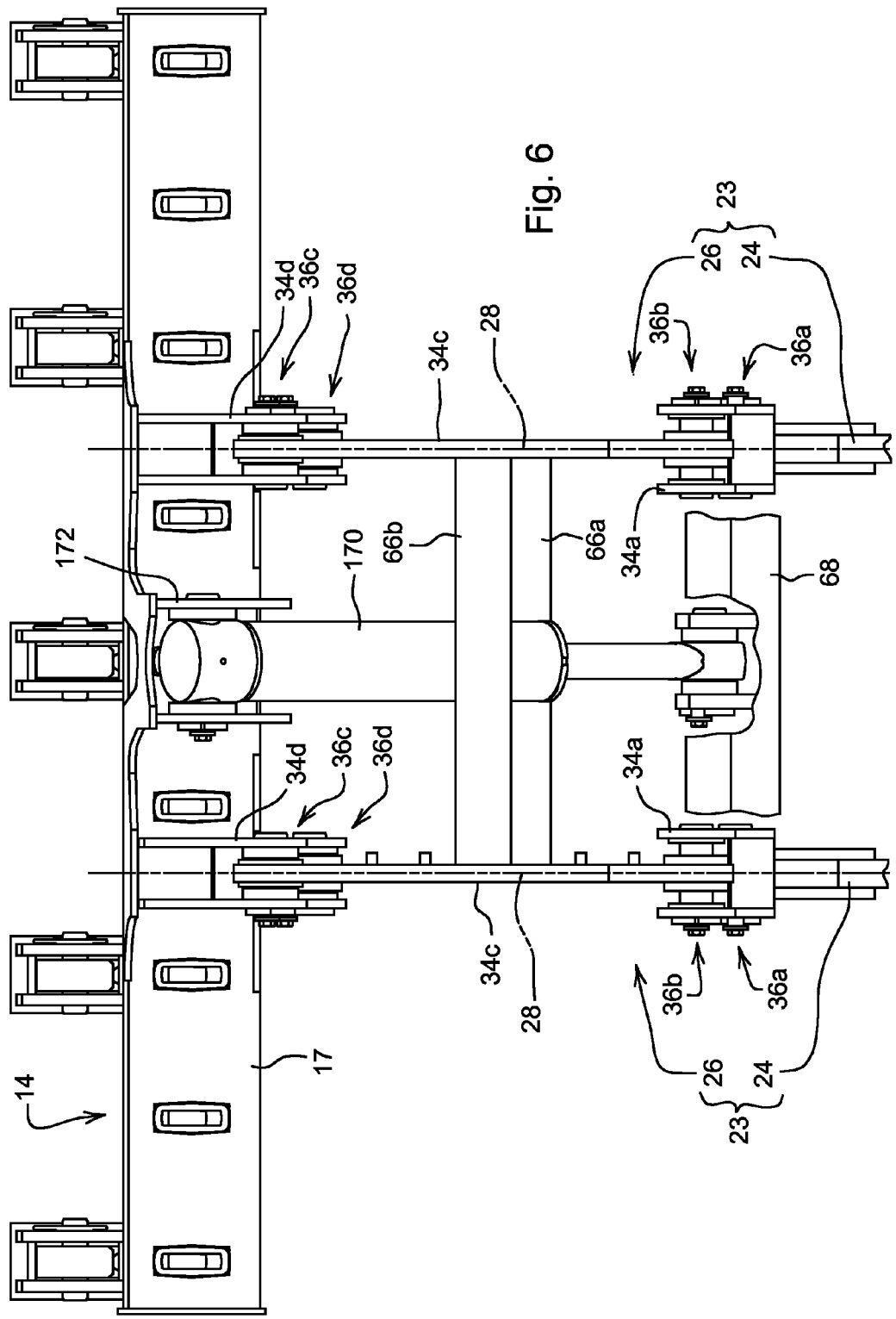
FIG. 6 is a plan view of the ripper assembly of FIG. 5.

Referring to FIGS. 5 and 6, a ripper assembly 112 is similar in structure and function to the ripper assembly 14, except that the ripper assembly 112 has a single hydraulic cylinder 170. Exemplarily, the cylinder 170 is pivotally attached at one end to a tower structure 172 and at an opposite end to the reinforcement plate 68. The enhanced load-management capability of the direct load paths 23 facilitate employment of a single cylinder 170.

Figure 7:
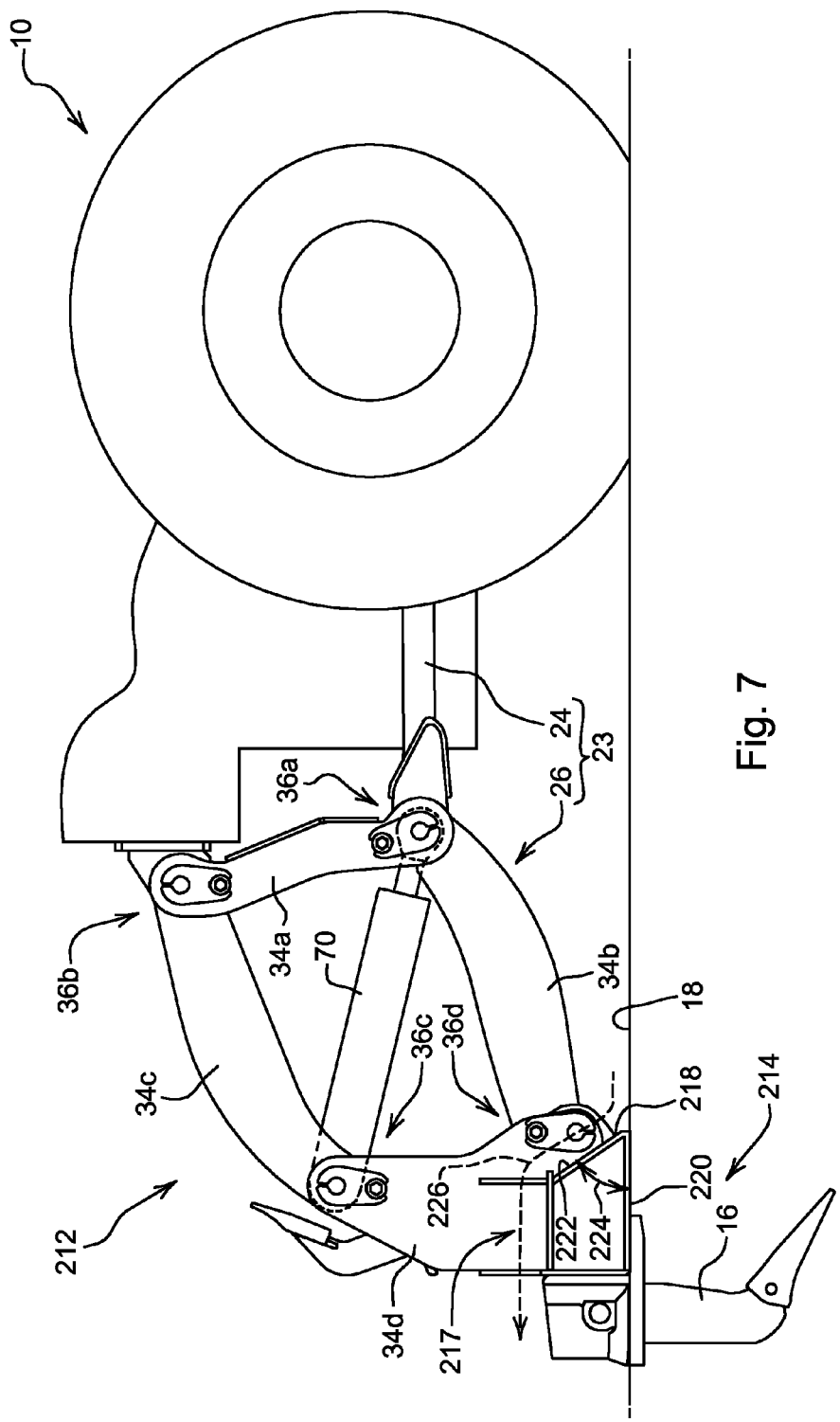
FIG. 7 is a side elevation view an embodiment of a ripper with a toolbar having a V-shaped leading edge for urging earth material to flow over the toolbar rather than underneath.

Referring to FIG. 7, a ripper assembly 212 includes a number of the components described above, such components being identified by the same reference numbers. The ripper assembly 212 differs primarily in the shape of a toolbar 217 of a ripper 214 of the ripper assembly 212, the toolbar 217 being the component to which the teeth 16 and the linkages 26 are attached. In particular, the toolbar 217 comprises a V-shaped leading edge 218 defined by an underside surface 220 (e.g., horizontal underside surface) and an inclined surface 222 sloping upwardly and rearwardly from the underside surface 220 at an acute angle 224 thereto. It is believed that such a V-shaped leading edge configuration would urge earth material to flow over the top of the toolbar 217 (as indicated by phantom arrow 226) as the vehicle 10 advances in the forward direction 20, allowing the teeth 16 to dig deeper into the earth material. By way of example and not limitation, the acute angle 224 may be between about 30° and about 60°.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

The invention claimed is:

1. A work vehicle, comprising:
a frame,
a ripper assembly comprising a ripper having multiple teeth, a first tie bar attached to the frame, a first four-bar linkage attached to and disposed between the ripper and the first tie bar for transferring a first load between the ripper and the frame via the first four-bar linkage and the first tie bar, a second tie bar attached to the frame, and a second four-bar linkage attached to and disposed between the ripper and the second tie bar for transferring a second load between the ripper and the frame via the second four-bar linkage and the second tie bar, the first four-bar linkage and the first tie bar being co-planar with respect to a first plane within which the first four-bar linkage is movable relative to the frame, the second four-bar linkage and the second tie bar being coplanar with respect to a second plane within which the second four-bar linkage is movable relative to the frame, wherein the ripper assembly further comprises a tool bar supporting a number of teeth adapted to break up earth material upon movement of the ripper in a forward direction by the work vehicle, the tool bar comprising a V-shaped leading edge defined by an underside surface and an inclined surface sloping upwardly and rearwardly from the underside surface at an acute angle thereto.

2. The work vehicle of claim 1, wherein, in a plan view of the ripper assembly, the first and second four-bar linkages and the first and second tie bars are, respectively, in-line with one another.

3. The work vehicle of claim 1, wherein the first four-bar linkage comprises a pivot joint to which the first tie bar is pivotally attached.

4. The work vehicle of claim 1, wherein the first four-bar linkage comprises a first bar, a second bar, and a pivot joint interconnecting the first bar, the second bar, and the first tie bar.

5. The work vehicle of claim 1, wherein the first four-bar linkage comprises a ground bar, a grounded bar, and a pivot joint interconnecting the ground bar, the grounded bar, and the first tie bar.

6. The work vehicle of claim 1, wherein the first and second planes are parallel to a fore-aft axis of the work vehicle.

7. The work vehicle of claim 1, wherein each of the first and second four-bar linkages comprises a pivot joint, the first tie bar is pivotally attached to the pivot joint of the first four-bar linkage, and the second tie bar is pivotally attached to the pivot joint of the second four-bar linkage.

8. The work vehicle of claim 1, wherein each of the first and second four-bar linkages comprises a first bar, a second bar, and a pivot joint, the pivot joint of the first four-bar linkage interconnects the first bar of the first four-bar linkage, the second bar of the first four-bar linkage, and the first tie bar, and the pivot joint of the second four-bar linkage interconnects the first bar of the second four-bar linkage, the second bar of the second four-bar linkage, and the second tie bar.

9. The work vehicle of claim 1, wherein each of the first and second four-bar linkages comprises a ground bar, a grounded bar, and a pivot joint, the pivot joint of the first four-bar linkage interconnects the ground bar of the first four-bar linkage, the grounded bar of the first four-bar linkage, and the first tie bar, and the pivot joint of the second four-bar linkage interconnects the ground bar of the second four-bar linkage, the grounded bar of the second four-bar linkage, and the second tie bar.

10. The work vehicle of claim 9, comprising a first hydraulic cylinder attached to the pivot joint of the first four-bar linkage and a second hydraulic cylinder attached to the pivot joint of the second four-bar linkage.

11. The work vehicle of claim 9, comprising a single hydraulic cylinder for moving the ripper relative to the frame.

12. A ripper assembly for use with a work vehicle, comprising:
- a ripper,
- a first tie bar adapted to be attached to a frame of the work vehicle,
- a second tie bar adapted to be attached to the frame of the vehicle,
- a first four bar linkage attached to and disposed between the ripper and the first tie bar for transferring a first load between the ripper and the frame via the first four bar linkage and the first tie bar,
- a second four-bar linkage attached to and disposed between the ripper and the second tie bar for transferring a load between the ripper and the frame via the second four-bar linkage and the second tie bar, wherein, in a plan view of the ripper assembly, the first and second four-bar linkages and the first and second tie bars are, respectively, in-line with one another, and
- a toolbar supporting a number of teeth adapted to break up earth material upon movement of the ripper in a forward direction by the work vehicle, the toolbar comprising a V-shaped leading edge defined by an underside surface and an inclined surface sloping upwardly and rearwardly from the underside surface at an acute angle thereto.

13. The ripper assembly of claim 12, wherein the first and second four-bar linkages and the first and second tie bars are, respectively, co-planar with respect to a first plane and a second plane within which the first and second four-bar linkages are, respectively, adapted to move relative to the frame.

14. The ripper assembly of claim 12, wherein the first four-bar linkage comprises a pivot joint to which the first tie bar is pivotally attached.

15. The ripper assembly of claim 12, wherein the first four-bar linkage comprises a first bar, a second bar, and a pivot joint interconnecting the first bar, the second bar, and the first tie bar.

16. The ripper assembly of claim 12, wherein the first four-bar linkage comprises a ground bar, a grounded bar, and a pivot joint interconnecting the ground bar, the grounded bar, and the first tie bar.

* * * * *